United States Patent
Usukura (10) Patent No.: US 9,467,686 B2
(45) Date of Patent: Oct. 11, 2016

(54) STEREOSCOPIC DISPLAY DEVICE FOR STEREOSCOPIC VIEWING AT MULTIPLE VIEWING POINTS

(71) Applicant: Sharp Kabushiki Kaisha, Osaka-shi, Osaka (JP)

(72) Inventor: Naru Usukura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 227 days.

(21) Appl. No.: 14/350,603

(22) PCT Filed: Oct. 2, 2012

(86) PCT No.: PCT/JP2012/075547
§ 371 (c)(1),
(2) Date: Apr. 9, 2014

(87) PCT Pub. No.: WO2013/061734
PCT Pub. Date: May 2, 2013

(65) Prior Publication Data
US 2014/0285643 A1  Sep. 25, 2014

(30) Foreign Application Priority Data
Oct. 25, 2011 (JP) .................. 2011-234318

(51) Int. Cl.
*H04N 13/04* (2006.01)
*G09G 3/36* (2006.01)
(Continued)

(52) U.S. Cl.
CPC ...... *H04N 13/0447* (2013.01); *G02B 27/2214* (2013.01); *G02F 1/13471* (2013.01);
(Continued)

(58) Field of Classification Search
CPC ............ H04N 13/0447; H04N 13/0404; H04N 13/0468; H04N 13/0033; H04N 13/0497; H04N 13/0409; H04N 13/0422; G09G 3/3648; G09G 3/3607; G09G 2300/08; G09G 2354/00; G09G 2320/028; G09G 2320/068; G02B 27/2214; G02B 35/24; G02F 1/134309; G02F 1/13471; G02F 2001/294; G02F 2201/18; G02F 2203/18; G02F 2203/28; G02F 2203/62
See application file for complete search history.

(56) References Cited

U.S. PATENT DOCUMENTS 5,493,427 A    2/1996  Nomura et al.
5,946,077 A *  8/1999  Nemirovskiy ........ G03B 35/24
                                              348/E13.007

(Continued)

FOREIGN PATENT DOCUMENTS

JP     07-072445 A     3/1995
JP     2007-336002 A   12/2007
JP     2010-282090 A   12/2010

OTHER PUBLICATIONS

Official Communication issued in International Patent Application No. PCT/JP2012/075547, mailed on Jan. 15, 2013.

*Primary Examiner* — Mohammed Jebari
(74) *Attorney, Agent, or Firm* — Keating & Bennett, LLP (57) ABSTRACT

A stereoscopic display device is provided that enables stereoscopy for various viewing positions. A stereoscopic display device (1) includes: a display panel (14) configured to display images for a plurality of viewpoints, the images having parallax and being arranged regularly; a light beam convertor (11) disposed adjacent the front side of the display panel (14) configured to form virtual lenticular lenses by controlling a voltage, the lenticular lenses adapted to the images on the display panel (14) and being arranged at a certain interval; and a controller configured to control the display panel (14) and the light beam convertor (11). The controller changes the focal length of the virtual lenticular lenses formed by the light beam convertor (11) depending on the distance between the display panel (14) and a viewer.

7 Claims, 6 Drawing Sheets

(51) Int. Cl.
*G02F 1/1343* (2006.01)
*G02F 1/1347* (2006.01)
*G02B 27/22* (2006.01)
*G03B 35/24* (2006.01)
*H04N 13/00* (2006.01)
*G02F 1/29* (2006.01)

(52) U.S. Cl.
CPC ......... *G02F1/134309* (2013.01); *G03B 35/24* (2013.01); *G09G 3/3607* (2013.01); *G09G 3/3648* (2013.01); *H04N 13/0033* (2013.01); *H04N 13/0404* (2013.01); *H04N 13/0468* (2013.01); *H04N 13/0497* (2013.01); *G02F 2001/294* (2013.01); *G02F 2201/18* (2013.01); *G02F 2203/18* (2013.01); *G02F 2203/28* (2013.01); *G02F 2203/62* (2013.01); *G09G 2300/08* (2013.01); *G09G 2320/028* (2013.01); *G09G 2320/068* (2013.01); *G09G 2354/00* (2013.01)

(56) References Cited

U.S. PATENT DOCUMENTS

| | | | | |
|---|---|---|---|---|
| 6,337,721 | B1* | 1/2002 | Hamagishi | G02B 27/2214 348/E13.029 |
| 2004/0008251 | A1* | 1/2004 | Mashitani | H04N 13/0409 348/51 |
| 2009/0244682 | A1* | 10/2009 | Saishu | H04N 13/0406 359/246 |
| 2010/0073465 | A1* | 3/2010 | Park | G02B 27/2214 348/51 |
| 2010/0238276 | A1* | 9/2010 | Takagi | G02B 27/2214 348/54 |
| 2012/0249530 | A1* | 10/2012 | Fukushima | G02B 27/2214 345/419 |
| 2012/0293503 | A1* | 11/2012 | Miyazawa | G02B 27/2214 345/419 |
| 2012/0320288 | A1* | 12/2012 | Baek | G02B 3/14 349/5 |

* cited by examiner

| S2[m] | f[mm] | V1[V] | V2[V] | V3[V] | V4[V] | V5[V] | V6[V] | V7[V] | V8[V] |
|---|---|---|---|---|---|---|---|---|---|
| 1.6 | 15.745 | 5.00 | 3.30 | 2.05 | 1.52 | 1.20 | 0.77 | 0.35 | 0.00 |
| 3.2 | 15.823 | 4.95 | 3.27 | 2.03 | 1.50 | 1.19 | 0.76 | 0.34 | 0.00 |

STEREOSCOPIC DISPLAY DEVICE FOR STEREOSCOPIC VIEWING AT MULTIPLE VIEWING POINTS

TECHNICAL FIELD

The present invention relates to a stereoscopic display device, and more particularly, a stereoscopic display device that enables naked eye stereoscopy.

BACKGROUND ART

Stereoscopic display devices that do not require special glasses or the like to be worn, or that enable so-called naked eye stereoscopy, are known. JP 2007-336002 A discloses a so-called multi-view stereoscopic display device.

The stereoscopic display device of JP 2007-336002 A generally operates on the following principle: the stereoscopic display device displays images captured in multiple directions, where the images are arranged regularly on the display surface. In front of the display surface, a plurality of lenticular lenses are arranged at a certain interval. The lenticular lenses separate the images captured in multiple directions. The user views the display device at the optimum position to view the separated images with his left and right eyes, and thus experiences stereoscopy caused by parallax.

JP 2010-282090 A discloses a stereoscopic display device including a display panel and variable lens array element. The variable lens array element includes a horizontal row of electrodes, at least one electrode being provided for one horizontal subpixel position on the display panel, and changes the shape of each cylindrical lens on a subpixel basis.

JP 2010-282090 A describes changing the lens pitch of the cylindrical lenses to change the number of horizontal pixels of the display panel associated with one cylindrical lens, thereby changing the number of viewpoints.

DISCLOSURE OF THE INVENTION

For a multi-view stereoscopic display device, a position at which the viewer views is assumed beforehand and various elements are designed assuming that that position is the optimum viewing position. Consequently, if the viewer is not at the optimum viewing position, he does not perceive a proper stereoscopic image. For example, an image to be seen by the right eye and an image to be seen by the left eye may be switched (i.e. reversed stereoscopy), or images for several viewpoints may be mixed (i.e. crosstalk). These phenomena may cause the viewer to feel uncomfortable or tired.

The stereoscopic display device of JP 2010-282090 A uses a variable lens array element to change the shape of each cylindrical lens on a subpixel basis. This document describes changing the positions of the cylindrical lenses as the viewing position of the viewer moves horizontally so as to prevent reversed stereoscopy and crosstalk.

However, in the stereoscopic display device of JP 2010-282090 A, a large number of electrodes must be precisely disposed to precisely adjust the positions of the cylindrical lenses.

In addition, JP 2010-282090 A does not discuss movements of the viewing position in a direction perpendicular to the display panel (i.e. changes in the viewing distance).

If the changes in the viewing distance are to be addressed by changing the lens pitch, the amount by which the lens pitch is to be changed as the viewing distance changes is very small. This requires a large number of electrodes to be provided to form a target lens pitch.

If a variable lens array is constituted by a liquid crystal lens, the liquid crystal may not respond sufficiently quickly to changes in potential used to cause the lens pitch to change.

An object of the present invention is to provide a stereoscopic display device that enables stereoscopy for various viewing positions.

A stereoscopic display device disclosed herein includes: a display panel configured to display images for a plurality of viewpoints, the images having parallax and being arranged regularly; a light beam convertor disposed adjacent a front side of the display panel configured to form virtual lenticular lenses by controlling a voltage, the lenticular lenses being adapted to the images on the display panel and arranged at a certain interval; and a controller configured to control the display panel and the light beam convertor. The controller changes a focal length of the virtual lenticular lenses formed by the light beam convertor depending on a distance between the display panel and a viewer.

The present invention provides a stereoscopic display device that enables stereoscopy for various viewing points.

EMBODIMENTS FOR CARRYING OUT THE INVENTION

A stereoscopic display device according to an embodiment of the present invention includes: a display panel configured to displayed images for a plurality of viewpoints, the images having parallax and being arranged regularly; a light beam convertor disposed adjacent a front side of the display panel configured to form virtual lenticular lenses by controlling a voltage, the lenticular lenses being adapted to the images on the display panel and arranged at a certain interval; and a controller configured to control the display panel and the light beam convertor. The controller changes a focal length of the virtual lenticular lenses formed by the light beam convertor depending on a distance between the display panel and a viewer (first arrangement).

In the above arrangement, the virtual lenticular lenses formed by the light beam convertor separate parallax images displayed on the display panel. The focal length of the virtual lenticular lenses may be changed depending on the distance between the display panel and viewer to enable stereoscopy for various viewing distances.

In connection with the above first arrangement, it is preferable that the controller adjusts a number of viewpoints associated with the images displayed by the display panel depending on the distance between the display panel and the viewer (second arrangement).

In the above arrangement, the number of viewpoints may be adjusted to adjust the number of pixels on the display panel for one virtual lenticular lens. This will prevent crosstalk caused by changes in the viewing distance.

In connection with the above first or second arrangement, it is preferable that the controller translates the images displayed by the display panel depending on a position of the viewer (third arrangement).

The above arrangement will prevent reversed stereoscopy and increase viewing positions where stereoscopy is possible.

In connection with one of the above first to third arrangements, it is preferable that the controller adjusts a parallax amount of the images displayed by the display panel depending on the distance between the display panel and the viewer (fourth arrangement).

The above arrangement will allow the viewer to experience more natural stereoscopy.

In connection with one of the above first to fourth arrangements, the device may further include an automatic viewing position detector configured to automatically detect a position of the viewer (fifth arrangement).

In connection with one of the above first to fifth arrangements, the light beam convertor may be a gradient index lens using liquid crystal (sixth arrangement).

In connection with one of the first to sixth arrangements, the display panel may be a liquid crystal display (seventh arrangement).

Embodiment

Now, embodiments of the present invention will be described in detail with reference to the drawings. The same or corresponding components in the drawings are labeled with the same characters and their description will not be repeated. For ease of understanding, the drawings to which reference will be made hereinafter show simplified or schematic representation, or do not show some components. The size ratios of the components shown in the drawings do not necessarily represent the actual size ratios.

Figure 1:
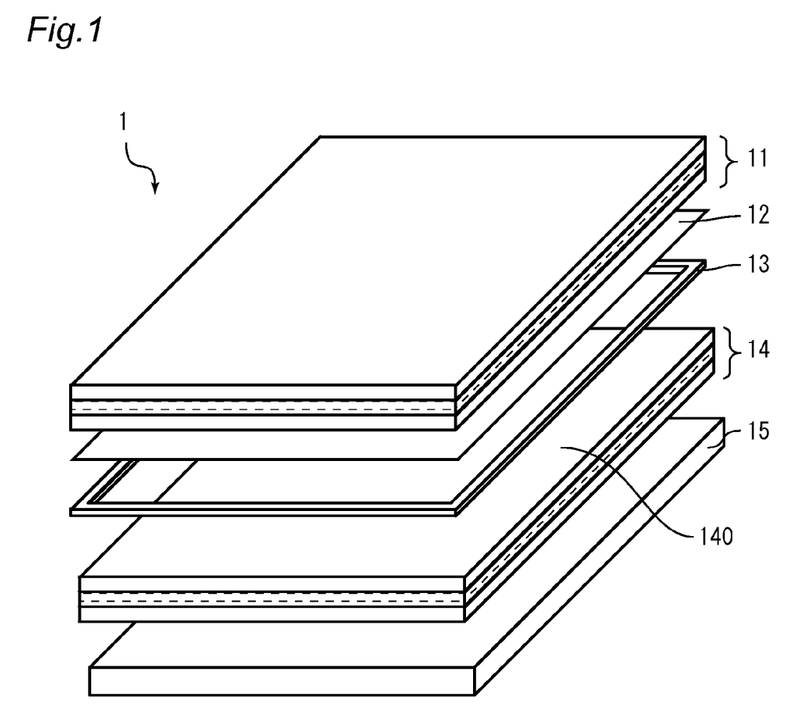
FIG. 1 is an exploded schematic perspective view of a stereoscopic display device according to an embodiment of the present invention.

FIG. 1 is an exploded schematic perspective view of a stereoscopic display device 1 according to an embodiment of the present invention. The stereoscopic display device 1 includes a liquid crystal lens 11, a retarder 12, a spacer 13, a liquid crystal display 14, and a backlight 15.

Each of the liquid crystal lens 11 and liquid crystal display 14 is in the shape of a plate that is generally rectangular in a plan view, and includes main faces (i.e. the set of opposite faces with the largest area) that have generally the same size.

The liquid crystal lens 11, whose detailed construction will be described later below, includes a pair of substrates and a liquid crystal layer sandwiched between these substrates. The liquid crystal lens 11 changes the orientation of liquid crystal molecules in the liquid crystal layer to change the behavior of light passing through the liquid crystal layer.

The retarder 12 is disposed adjacent the back side of the liquid crystal lens 11. The retarder 12 adjusts the direction of polarization of light emitted by the liquid crystal display 14 to align it with the direction in which the liquid crystal molecules in the liquid crystal lens 11 lie after a change in orientation. While the present embodiment uses a retarder 12, it may use no retarder 12 for some directions of polarization of light emitted by the liquid crystal display 14.

The liquid crystal display 14 is disposed adjacent the back side of the retarder 12, with the spacer 13 located in between. The liquid crystal display 14 includes a display unit 140, an active-matrix substrate, and a color filter substrate pairing with it, and a liquid crystal layer sandwiched between the substrates. The active-matrix substrate includes a thin-film transistors (TFTs) and pixel electrodes arranged in a matrix. The liquid crystal display 14 controls the TFTs to change the orientation of those liquid crystal molecules in the liquid crystal layer that are located above desired pixel electrodes. In this manner, the liquid crystal display 14 displays a desired image on the display unit 14.

The backlight 15 is disposed adjacent the back side of the liquid crystal display 14. The backlight 15 directs light to the liquid crystal display 14.

The stereoscopic display device 1 controls the liquid crystal lens 11 and liquid crystal display 14 in a coordinated manner for stereoscopic display.

Figure 2A:
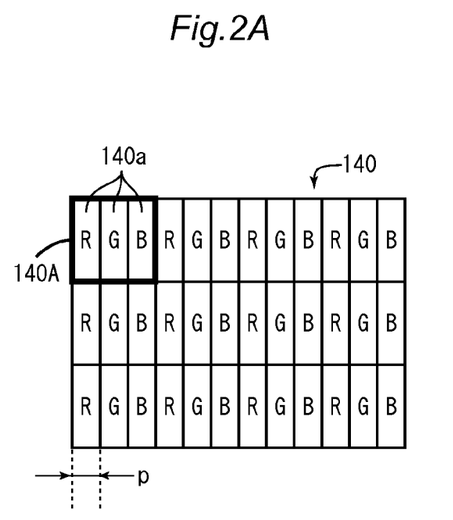
FIG. 2A shows pixels arranged on the display unit of the liquid crystal display.

FIG. 2A shows pixels arranged on the display unit 140 of the liquid crystal display 14. The display unit 140 is composed of a large number of pixels 140A. Each of the pixels 140A is composed of subpixels 140a for red (R), green (G) and blue (B). The subpixels 140a are arranged uniformly at an interval p in a horizontal direction. The liquid crystal display 14 displays, on a regular basis, images for a plurality of viewpoints having parallax (hereinafter referred to as parallax images), where a subpixel 140a constitutes a display unit.

Figure 2B:
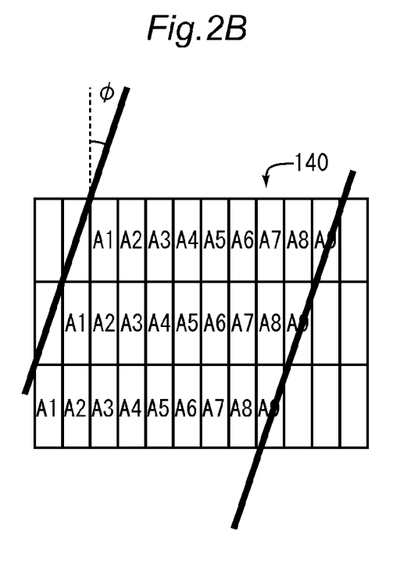
FIG. 2B shows an example of how images for a plurality of viewpoints having parallax may be disposed on subpixels.

FIG. 2B shows an example of how parallax images may be disposed on subpixels 140a. As shown in FIG. 2B, images for the same viewpoint (designated by one of the numbers A1, A2, . . . A9 in FIG. 2B) are arranged with an angle φ relative to the vertical direction. In the example of FIG. 2B, a series of images for the same viewpoint are displayed in such a way that there is a shift by one line in a horizontal direction as it goes by one line in a vertical direction. The images are displayed in this manner because, if a series of images for the same viewpoint are arranged in a direction consistent with the direction in which the subpixels are arranged (i.e. φ=0), the coloring may be uneven for some viewpoints or moire may become conspicuous.

Figure 3:
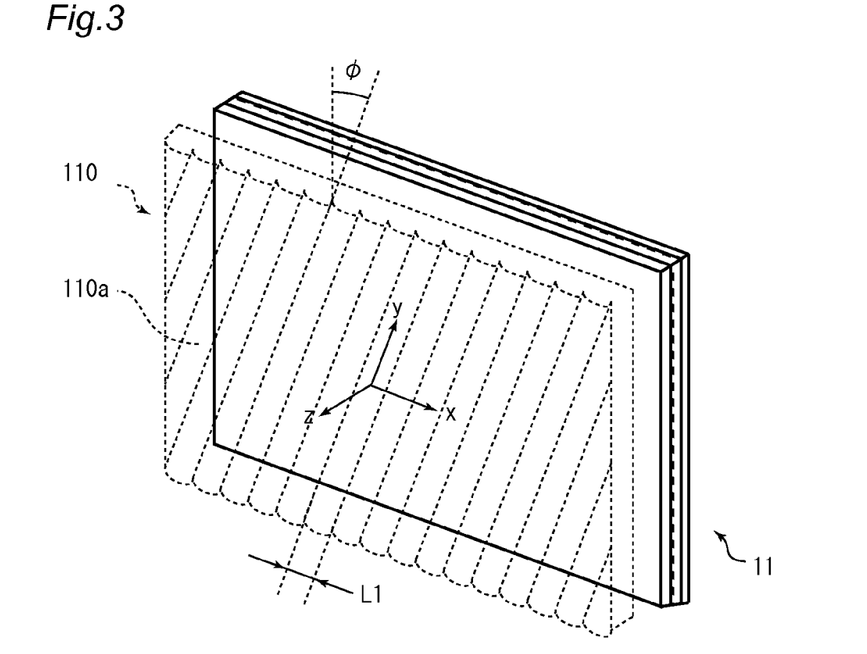
FIG. 3 schematically shows the relationship between the liquid crystal lens and a virtual lenticular screen formed by the liquid crystal lens.

FIG. 3 schematically shows the relationship between the liquid crystal lens 11 and a virtual lenticular screen 110 formed by the liquid crystal lens 11. The virtual lenticular screen 110 is composed of a large number of virtual lenticular lenses 110a. The liquid crystal lens 11 forms a plurality of lenticular lenses 110a arranged at a certain interval L1, adapted to the images displayed on the liquid crystal display 14. The lenticular lenses 110a are at an angle φ, consistent with the images on the liquid crystal display 14.

In the following description, a direction in which the lenticular lenses 110a are arranged will be referred to as an x-direction, a direction in which the lenticular lenses 110a extend a y-direction, and a thickness direction of the liquid crystal lens 11 a z-direction.

Figure 4:
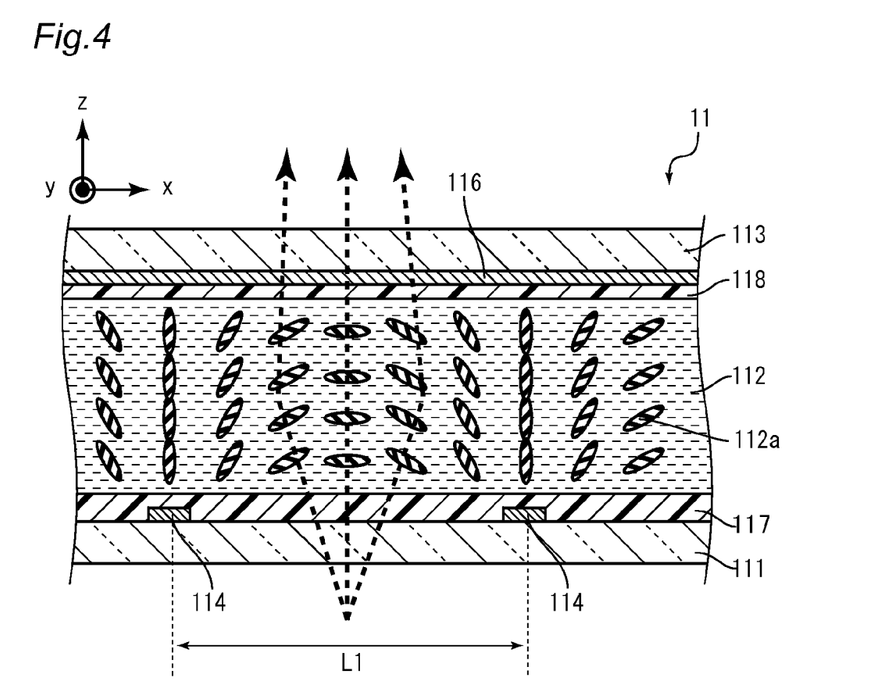
FIG. 4 is a cross-sectional view of the liquid crystal lens taken along a plane perpendicular to the y-axis.

FIG. 4 is a cross-sectional view of the liquid crystal lens 11 taken along a plane perpendicular to the y-direction. The liquid crystal lens 11 includes a control substrate 111, a counter-substrate 113 and a liquid crystal layer 112 sandwiched between these substrates.

In the present embodiment, the liquid crystal molecules 112a constituting the liquid crystal layer 112 have a positive dielectric constant anisotropy. The liquid crystal molecules 112a are birefringent. That is, the refractive index $n_o$ for light vibrating in a direction parallel to the optical axis is different from the refractive index $n_o$ for light vibrating in a direction perpendicular to the optical axis. Preferably, the liquid crystal molecules 112a have a relatively large value of $\Delta n = n_e - n_o$.

A plurality of main electrodes 114 are provided on the control substrate 111. The main electrodes 114 are elongated in the y-direction and arranged at an interval L1 in the x-direction to extend generally parallel to each other.

The main electrodes 114 is covered with an oriented film 117.

A common electrode 116 is formed over the entire face of the counter electrode 113. The common electrode 116 is covered with an oriented film 118.

A plurality of grooves are formed in the oriented films 117 and 118 by an orientation process to extend parallel to the x-direction. Due to the presence of the oriented films 117 and 118, the liquid crystal molecules 112a are oriented in such a way that their longitudinal axis is parallel to the x-direction when no voltage is applied to the liquid crystal layer 112 (i.e. no-voltage-application mode).

When a voltage is applied between the main electrodes 114 and common electrode 116, an electric field is generated by this voltage. The liquid crystal molecules 112a are oriented such that the electric field is parallel to the longitudinal axis of the molecules. As shown in FIG. 4, those liquid crystal molecules 112a that are located near the main electrodes 114 are oriented such that their longitudinal axis is parallel to the z-direction. The longitudinal axis of liquid crystal molecules 112a that are more distant from the main electrodes 114 are inclined in a direction closer to the x-direction instead of the z-direction.

The refractive index of the liquid crystal layer 112 changes as the orientation of the liquid crystal molecules 112a changes. Thus, the liquid crystal layer 112 has a distribution of refractive indexes along the x-direction. Based on this distribution of refractive indexes, the liquid crystal layer 112 focuses light entering the liquid crystal layer 112, as indicated by arrows with broken lines in FIG. 4. That is, the liquid crystal lens 11 serves as a gradient index (GRIN) lens.

The liquid crystal lens 11 controls the potential difference between the main electrodes 114 and common electrode 116 to control the lens shape and thus change the focal length.

Further, in no-voltage-application mode, the liquid crystal molecules 112a are oriented uniformly due to the oriented films 117 and 118 such that the liquid crystal lens 11 does not serve as a GRIN lens. The stereoscopic display device 1 controls the liquid crystal lens 11 and liquid crystal display 14 in a coordinated manner to switch between two- and three-dimensional image displays.

The construction of the liquid crystal lens 11 in the present embodiment has been described. In the description of the present embodiment, the liquid crystal molecules 112a constituting the liquid crystal layer 112 have a positive dielectric constant anisotropy. Alternatively, the liquid crystal molecules 112a may have a negative dielectric constant anisotropy.

For the sake of simplification, the present embodiment has illustrated an implementation where a voltage of one level is applied to produce a GRIN lens. Preferably, however, a plurality of electrodes may be provided for one GRIN lens pitch to apply a voltage of multiple levels. This is because a finer lens shape may be produced that way.

Adjustment of Focal Length F and Displayed Images

Next, adjustment of the focal length f and displayed images according to the present embodiment will be described with reference to FIGS. 5 to 7.

Figure 5:
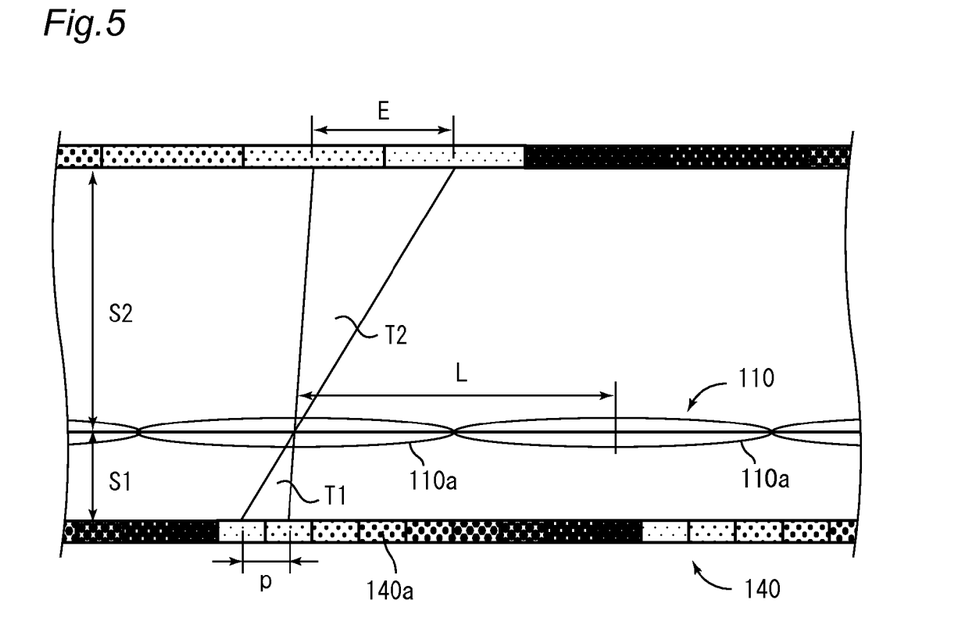
FIG. 5 illustrates adjustment of the focal length and displayed images according to the present embodiment.

As shown in FIG. 5, the display unit 140 includes subpixels 140a arranged at in interval p. A series of N images (FIGS. 5 to 7 illustrate N=9) for different viewpoints having parallax are displayed where a subpixel 140a constitutes a display unit.

A lenticular screen 110 is spaced apart from the display surface by a distance S1. The lenticular screen 110 is composed of a plurality of lenticular lenses 110a which are arranged at an interval (pitch) L. L and L1 satisfy the following relationship:

$$L1 = L \cos \phi \quad (1).$$

A case where the display unit 140 is viewed from a position at a viewing distance S2 from the lenticular screen 110 will be discussed. In order that images displayed on two adjacent subpixels 140a are separated by an inter-viewpoint distance E as viewed from this position, the following equation, which may be derived from the scaling relationship between the two triangles T1 and T2 shown in FIG. 5, must be satisfied:

$$S1 : p = S2 : E \quad (2).$$

Figure 6:
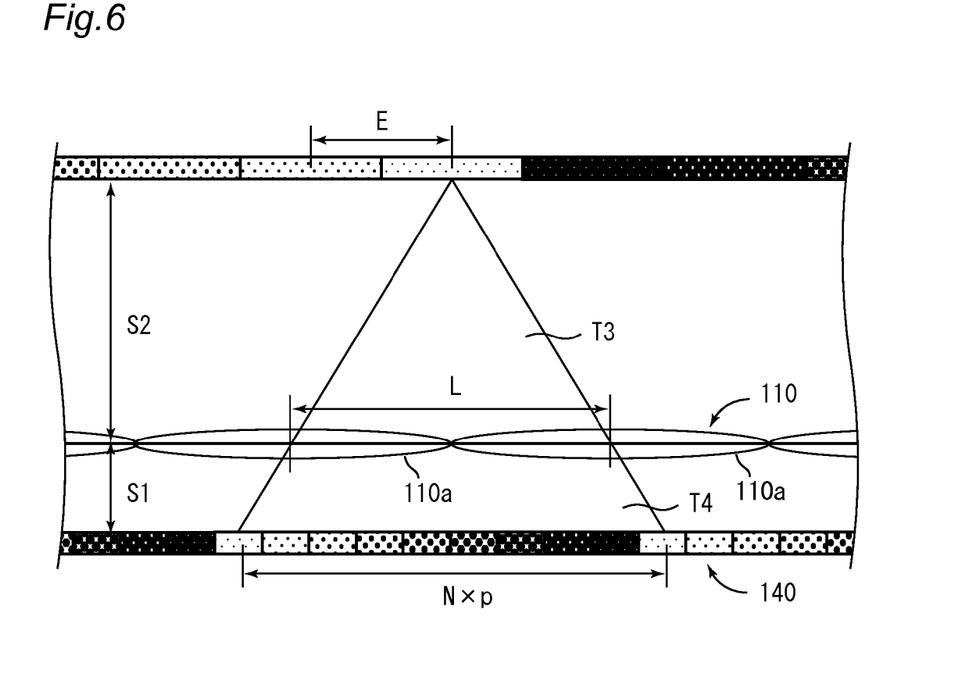
FIG. 6 illustrates adjustment of the focal length and displayed images according to the present embodiment.
Figure 7:
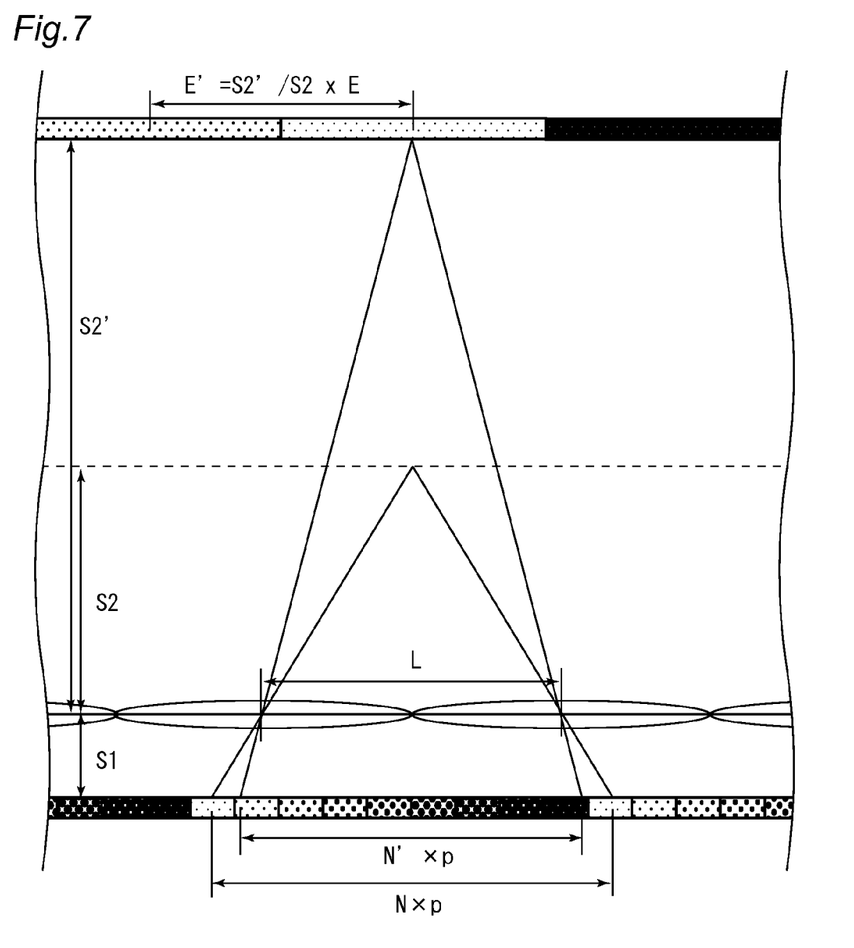
FIG. 7 illustrates adjustment of the focal length and displayed images according to the present embodiment.

Further, the following relationship between the number of viewpoints N and the pitch L of the lenticular lenses 110a may be derived from the scaling relationship between the triangles T3 and T4 shown in FIG. 6:

$$S2 : L = S1 + S2 : N \times p \quad (3).$$

In addition to Equations (2) and (3), the focal length f of the lenticular lenses 110a must satisfy the following equation:

$$1/S1 + 1/S2 = 1/f \quad (4).$$

Next, a case will be discussed where the display unit 140 is viewed from a position that is at a viewing distance S2' (S2'>S2) from the lenticular screen 110, with the pitch L and distance S1 unchanged. Then, the inter-viewpoint distance E' is given by Equation (2) as E'=S2'/S2×E. As such, as shown in FIG. 7, the pitch L of the lenticular lenses 110a does not correspond to the interval of images for the same viewpoint displayed on the display unit 140, generating crosstalk where a mixture of images for different viewpoints are viewed.

To prevent crosstalk without changing the pitch L and distance S1, the display unit 140 must be modified to change the interval of displayed images for the same viewpoint. Since it is not realistic to change the pitch p of the subpixels 140a, changing the number of viewpoints from N to N' will be discussed. N' satisfies the following relationship derived in a manner similar to that for Equation (3):

$$S2' : L = S1 + S2 : 'x p \quad (5).$$

An implementation where N' is a non-integer will be described. For example, a case where N'=8.95 will be discussed. Since the number of subpixels 140a for one line of lenticular lenses 110a is 8.95, the number of subpixels 140a for 100 lines of lenticular lenses 110a is 895. For N=9, the number of subpixels 140a for 100 lines of lenticular lenses 110a is 900, which suggests that 5 subpixels, distributed equally, may be culled. That is, an image for one viewpoint may be skipped for every 20 lines of lenticular lenses 110a.

In addition, the focal length of the lenticular lenses 110a must be changed to the following focal length f:

$$1/S1 + 1/S2' = 1/f' \qquad (6).$$

As discussed below, the stereoscopic display device 1 according to the present embodiment detects a change in the viewing distance S2 to determine the optimum number of viewpoints N and focal length f. Then, the number of viewpoints N is adjusted using the liquid crystal display 14, and the focal length f is adjusted using the liquid crystal lens 11.

A procedure for adjusting the focal length f and displayed images when the viewer moves in a direction perpendicular to the display unit 140 of the stereoscopic display device 1 (i.e. when the viewing distance S2 changes) has been described. Next, a procedure followed when the viewer moves in a direction parallel to the display unit 140 the stereoscopic display device 1 will be described.

Figure 8:
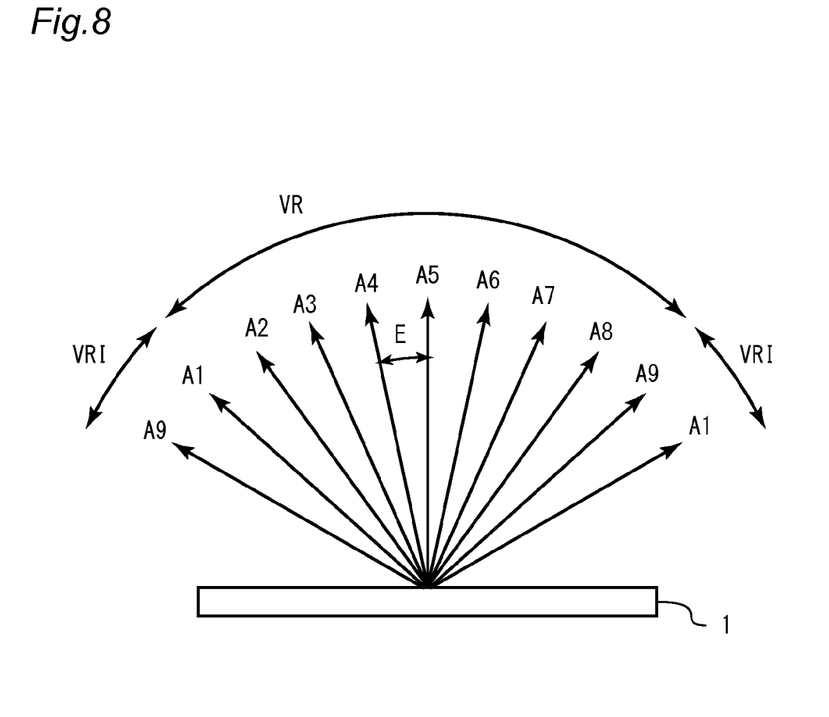
FIG. 8 schematically illustrates the relationship between the number of viewpoints, the inter-viewpoint distance, and the range where a stereoscopic image can be viewed.

FIG. 8 schematically illustrates the relationship between the number of viewpoints N, the inter-viewpoint distance E, and the range where a stereoscopic image can be viewed (hereinafter referred to as viewing range) VR. Arrows A1, A2, ... A9 indicate the positions at which images for the various viewpoints are viewed. As shown in FIG. 8, a multi-view system provides a finite number of viewpoints N (N=9 in FIG. 8), and thus the viewing range VR is also finite. For a viewer in the ranges VRI, which are outside the viewing range VR, reversed stereoscopy occurs where an image to be seen by the right eye and an image to be seen by the left eye are switched.

As discussed below, the stereoscopic display device 1 of the present embodiment detects a change in the position of the viewer. Then, depending on the position of the viewer, the device translates parallax images to prevent reversed stereoscopy.

Figure 9:
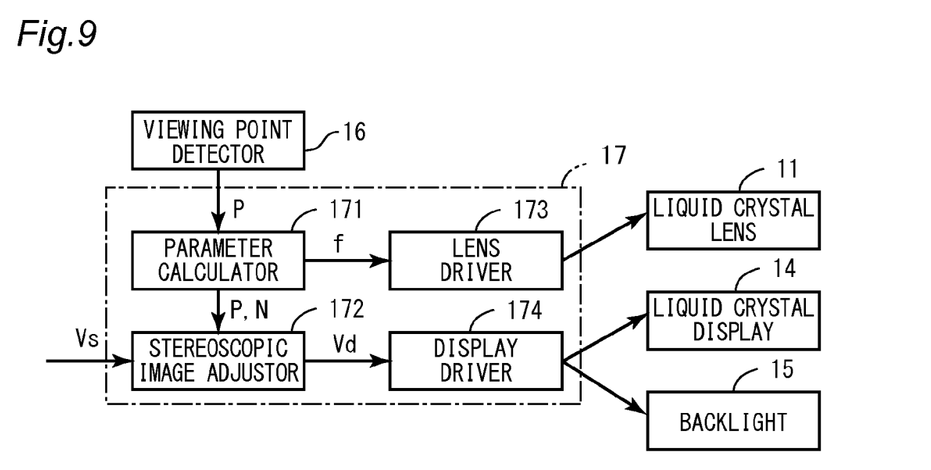
FIG. 9 is a functional block diagram of a stereoscopic display device according to an embodiment of the present invention, illustrating how the focal length and displayed images may be adjusted.

FIG. 9 is a functional block diagram of a stereoscopic display device 1 illustrating how the focal length f and displayed images may be adjusted. The stereoscopic display device 1 includes, in addition to the features described above, a viewing position detector 16 and a controller 17.

The viewing position detector 16 informs the controller 17 of the position P of the viewer. Preferably, the viewing position detector 16 may include a camera combined with an image processing circuit, for example, to automatically detect the position P of the viewer; alternatively, the detector may be a controller where the viewer manually enters a position P.

The controller 17 receives information regarding the position P of the viewer from the viewing position detector 16, as well as an image signal Vs from the outside. Based on these kinds of information, the unit controls the liquid crystal lens 11, liquid crystal display 14 and backlight 15. The controller 17 may be mounted as a module on a substrate or the like that constitutes the liquid crystal lens 11 or liquid crystal display 14, or may be a separate part. Further, not the entire controller 17 may be mounted as hardware. That is, part of the controller 17 may be a virtual functional block implemented by a computer program executed by a processor.

The controller 17 includes a parameter calculator 171, a stereoscopic image adjuster 172, a lens driver 173 and a display driver 174.

The parameter calculator 171 receives information regarding the position P of the viewer from the viewing position detector 16. Then, based on the viewing distance S2 contained in the position P of the viewer, the calculator calculates the focal length f and the number of viewpoints N. Thereafter, the calculator informs the lens driver 173 of the focal length f. Further, the calculator informs the stereoscopic image adjustor 172 of the position P of the viewer and the number of viewpoints N.

The stereoscopic image adjustor 172 receives information regarding the position P of the viewer and number of viewpoints N from the parameter calculator 171. The stereoscopic image adjustor 172 receives an image signal Vs from the outside.

An image signal Vs may be multi-channel data containing images captured in two or more directions, for example. Assuming that the number of channels of the received images is M, the stereoscopic image adjustor 172 generates, from the image data in M channels, image data for N viewpoints.

Image data may be generated by the stereoscopic image adjustor 172 by skipping an image for a certain viewpoint on a regular basis, as discussed above. Alternatively, image data for N viewpoints may be reconstructed by interpolation on image data in M channels, for example. Here, it is desirable that the parallax amount of images for various viewpoints is adjusted depending on the viewing distance S2. Adjustments to the parallax amount will allow the viewer to experience more natural stereoscopy. The smaller the viewing distance S2, the larger the parallax amount becomes; the larger the viewing distance S2, the smaller the parallax amount becomes.

Further, parallax images may be translated depending on the position P of the viewer to prevent reversed stereoscopy.

Alternatively, an image signal Vs may contain a two-dimensional image and depth information for each of its pixels. Still alternatively, the stereoscopic image adjustor 172 may estimate a stereoscopic image based on a single-channel two-dimensional image to generate image data for N viewpoints.

The stereoscopic image adjustor 172 provides the generated image data for N viewpoints, in the form of an image signal Vd, to the display driver 174.

The lens driver 173 receives information regarding the focal length f from the parameter calculator 171 and drives the liquid crystal lens 11 based on this value.

The display driver 174 receives the image signal Vd from the stereoscopic image adjustor 172 and drives the liquid crystal display 14 and backlight 15 based on this signal.

The construction of the stereoscopic display device 1 of the present embodiment and how the stereoscopic display device 1 adjusts the focal length f and displayed images have been described.

The stereoscopic display device 1 controls the focal length f to enable the experience of stereoscopy in various viewing positions. The focal length f may be controlled by controlling a voltage applied to the liquid crystal lens 11.

If the viewing position were to be adjusted by adjusting the lens pitch, a large number of electrodes would be required to provide sufficient resolution for adjusting the lens pitch. The present embodiment requires only a small number of electrodes.

If the lens pitch were to be changed, even a small amount of change would require a significant change in the orientation of liquid crystal molecules 112a because of a large number of cylindrical lenses 110a are arranged. In contrast, if the focal length f is to be changed, as in the present embodiment, a small amount of change requires only a small amount of change in the orientation of liquid crystal molecules 112a. This results in improved response speed.

The present embodiment illustrates an implementation where red, green and blue subpixels 140a are arranged in a horizontal direction in each of the pixels 140A of the display unit 140. Alternatively, each pixel 140A may include more subpixels, and may include subpixels capable of displaying other colors. Further, the subpixels 140a in each pixel 140A may be arranged in any manner, and may be arranged in a vertical direction or divided into a plurality of columns.

In the present embodiment, the display unit 140 displays parallax images arranged in stripes. However, images for a plurality of viewpoints may be arranged in any manner as long as they are arranged on a regular basis for display, and the liquid crystal lens 11 may be adjusted accordingly.

Now, more specific implementations with numeric values will be described. These implementations are not intended to limit the present embodiment.

First Embodiment

A stereoscopic display device 1 is designed where the inter-viewpoint distance E=16.25 mm, the number of viewpoints N=9, and the liquid crystal display 14 is a full high-definition (resolution: 1920×1080 pixels) display with a diagonal size of 42 inches (1066.8 mm). The liquid crystal display 14 has square pixels 140A, each divided equally into red, green and blue subpixels 140a arranged in a horizontal direction. Then, a pixel 140A has a side of about 484.5 µm, and the interval p of the subpixels 140a as measured in a horizontal direction is about 161.5 µm. Angle φ is 18.4°.

Generally, the optimum distance from which to view the display is three times the vertical size of the display. Now, a design of various elements will be described based on the condition that the optimum viewing distance S2 is 1.6 m.

Equation (2) gives S1=14.902 mm. Equation (3) gives L=1439.199 µm, and Equation (1) gives L1=1365.342 µm. Further, Equation (4) gives f=14.745 mm.

A case will be discussed where this stereoscopic display device 1, designed based on the condition that the optimum viewing distance S2=1.6 m, is viewed at the viewing distance S2'=3.2 m. Then, Equation (5) gives N'=8.96 and Equation (6) gives f=15.823.

Figure 10:
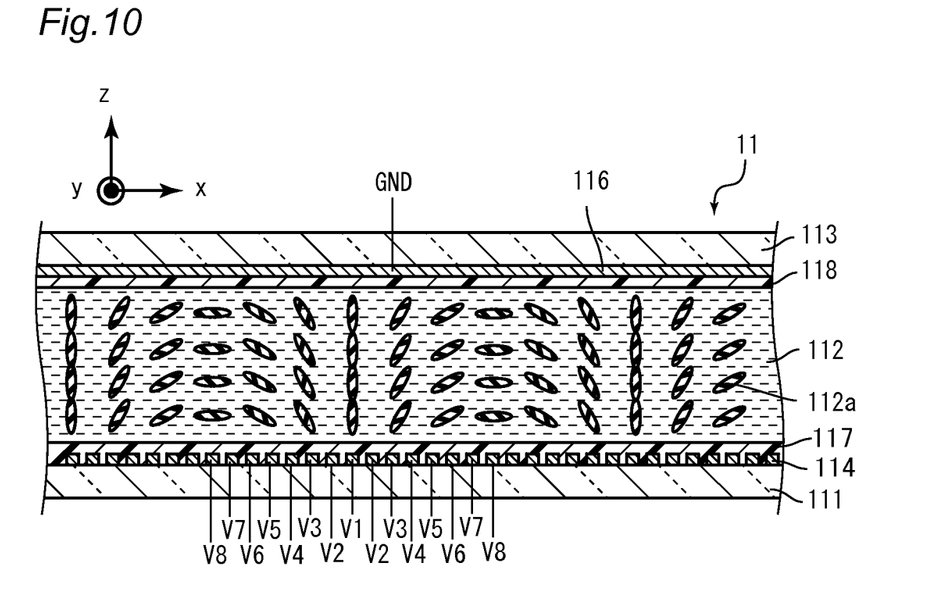
FIG. 10 is a cross-sectional view of a liquid crystal lens of a stereoscopic display device according to a first embodiment of the present invention.

To realize lenticular lenses 110a having these focal lengths f and f', a liquid crystal lens 11 was designed in the following manner: as shown in FIG. 10, for one lenticular lens 110a, 15 main electrodes 114 were arranged at an equal interval such that 8 voltages (V1, V2, ... V8) of different levels can be applied to the electrodes symmetrically with respect to the centerline of each lenticular lens 110a to form an electrode field. The common electrode 116 was the ground potential. The width of each main electrode 114 was about 20 µm, and the interval of the main electrodes 114 was 97.5 µm. The liquid crystal molecules 112a constituting the liquid crystal layer 112 had Δn=0.17.

Figure 11:
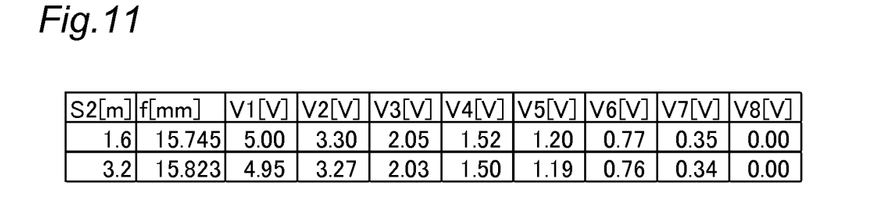
FIG. 11 is a table of adjusted values of potentials V1, V2, . . . V9 applied to the main electrodes to form appropriate focal lengths for viewing distances of 1.6 m and 3.2 m.

FIG. 11 is a table of adjusted values of potentials V1, V2, ... V8 applied to the main electrodes 114 to form the appropriate focal lengths f for viewing distances S2 of 1.6 m and 3.2 m.

Second Embodiment

In the first embodiment, a case where the viewing distance S2 is longer than its normal value has been discussed. Next, a case where the viewing distance S2 is smaller than its normal value will be discussed.

When the viewing distance S2 is smaller, reductions in the inter-viewpoint distance E must be taken into consideration. As the inter-viewpoint distance E decreases, the viewing range VR decreases, as well (see FIG. 8). If the viewing range VR is smaller than the distance between the eyes (generally assumed to be 65 mm), a stereoscopic image cannot be viewed. Thus, for 9 viewpoints, for example, the inter-viewpoint distance E must be at least 65 mm/8=8.125 mm or larger. To give some margin to this value, a stereoscopic display device 1 is designed such that the inter-viewpoint distance E for viewing at the smallest viewing distance S2 is 16.25 mm.

For example, if a stereoscopic display device 1 is designed that can be viewed properly when the viewing distance S2=1.2 m or when the viewing distance S2=1.6 m, a device is designed such that the inter-viewpoint distance E is 16.25 mm when the viewing distance S2=1.2 m.

Assuming that the inter-viewpoint distance E=16.25 mm, the number of viewpoints N=9, the liquid crystal display 14 is a full high-definition display with a diagonal size of 42 inches, and the viewing distance S2=1.2 m, Equation (2) gives S1=11.926 mm, Equations (1) and (3) give L1=1365.342 µm, and Equation (4) gives f=11.809 mm.

Thus, when a stereoscopic display device 1 designed based on the condition that the optimum viewing distance S2=1.2 m is viewed at the viewing distance S2'=1.6 m, Equation (5) gives N'=8.98 and Equation (6) gives f=11.838.

Other Embodiments

While embodiments of the present invention have been described, the invention is not limited to the above embodiments, and various modifications and combinations are possible within the scope of the invention.

INDUSTRIAL APPLICABILITY

The present invention is industrially useful as a stereoscopic display device that enables naked eye stereoscopy.

The invention claimed is:
1. A stereoscopic display device comprising:
a display panel configured to display images for a plurality of viewpoints, the images having parallax and being arranged regularly;
a light beam convertor disposed adjacent a front side of the display panel configured to form virtual lenticular lenses by controlling a voltage, the lenticular lenses being adapted to the images on the display panel and arranged at a certain interval; and
a controller configured to control the display panel and the light beam convertor, wherein
the controller changes a focal length of the virtual lenticular lenses formed by the light beam convertor depending on a distance between the display panel and a viewer;
the controller reduces a number of the plurality of viewpoints when the distance between the display panel and the viewer becomes larger; and
where S1 represents a distance between the lenticular lenses and a surface of the display panel, S2 represents a distance between the lenticular lenses and a viewer, S2' represents a distance between the lenticular lenses and a viewer when the distance becomes larger, L represents a pitch of the lenticular lenses, N represents the number of viewpoints when a distance between the lenticular lenses and a viewer is S2, N' represents the number of viewpoints when a distance between the lenticular lenses and a viewer is S2' when the number of viewpoints is reduced from N to N', the following equations are satisfied:

$$S2:L=S1+S2:N{\times}p$$

$$S2':L=S1+S2':N'{\times}p.$$

2. The stereoscopic display device according to claim 1, wherein the controller translates the images displayed by the display panel depending on a position of the viewer.

3. The stereoscopic display device according to claim 1, wherein the controller adjusts a parallax amount of the images displayed by the display panel depending on the distance between the display panel and the viewer.

4. The stereoscopic display device according to claim 1, further comprising: an automatic viewing position detector configured to automatically detect a position of the viewer.

5. The stereoscopic display device according to claim 1, wherein the light beam convertor is a gradient index lens using liquid crystal.

6. The stereoscopic display device according to claim 1, wherein the display panel is a liquid crystal display.

7. The stereoscopic display device according to claim 1, wherein:
   the display panel includes a plurality of pixels each including subpixels, and
   where LL represents a number of the lenticular lenses, the controller reduce the number of the viewpoints by skipping images of LL×(N-N') subpixels.

* * * * *